US012680756B2

(12) United States Patent
Moon et al.

(10) Patent No.: US 12,680,756 B2
(45) Date of Patent: Jul. 14, 2026

(54) ELECTRODE SHEET DRYING APPARATUS CAPABLE OF PREVENTING THERMAL WRINKLES IN NON-COATED PORTION

(71) Applicant: LG Energy Solution, Ltd., Seoul (KR)

(72) Inventors: Jae Won Moon, Daejeon (KR); Jung Geun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 552 days.

(21) Appl. No.: 18/272,420

(22) PCT Filed: Oct. 27, 2022

(86) PCT No.: PCT/KR2022/016532
§ 371 (c)(1),
(2) Date: Jul. 14, 2023

(87) PCT Pub. No.: WO2023/085654
PCT Pub. Date: May 19, 2023

(65) Prior Publication Data
US 2024/0384931 A1 Nov. 21, 2024

(30) Foreign Application Priority Data
Nov. 10, 2021 (KR) ........................ 10-2021-0153675

(51) Int. Cl.
*F26B 13/00* (2006.01)
*F26B 13/12* (2006.01)
(Continued)

(52) U.S. Cl.
CPC ............ *F26B 13/002* (2013.01); *F26B 13/12* (2013.01); *F26B 13/183* (2013.01); *H01M 4/04* (2013.01)

(58) Field of Classification Search
CPC ...... F26B 13/002; F26B 13/12; F26B 13/183; H01M 4/04
(Continued)

(56) References Cited

U.S. PATENT DOCUMENTS

| | | | | |
|---|---|---|---|---|
| 5,775,002 A | * | 7/1998 | Iwase | F26B 13/16 |
| | | | | 34/620 |
| 6,212,789 B1 | * | 4/2001 | Kato | H10P 72/0422 |
| | | | | 134/902 |

(Continued)

FOREIGN PATENT DOCUMENTS

| | | | | |
|---|---|---|---|---|
| CN | 102671839 A | | 9/2012 | |
| CN | 116635683 A | * | 8/2023 | ............. H01M 4/04 |

(Continued)

OTHER PUBLICATIONS

International Search Report for PCT/KR2022/016532 mailed Feb. 6, 2023. 3 pgs.

(Continued)

*Primary Examiner* — Stephen M Gravini
(74) *Attorney, Agent, or Firm* — Lerner David LLP

(57) ABSTRACT

The present invention relates to an electrode sheet drying apparatus capable of preventing thermal wrinkles in a non-coated portion, and more particularly to an electrode sheet drying apparatus for drying an electrode sheet including a pair of coated portions each having an electrode active material applied to one surface of metal foil and a non-coated portion located between the pair of coated portions, the apparatus including a chamber configured to dry the electrode sheet therein, a heater provided at an upper part of the chamber, the heater being configured to adjust the temperature in the chamber to a temperature necessary to dry the electrode sheet, and at least one guide roll configured to guide movement of the electrode sheet in the chamber and to maintain tension of the electrode sheet, wherein a part of (Continued)

1000 the electrode sheet is moved in a state of being spaced apart from the guide roll.

20 Claims, 2 Drawing Sheets

(51) Int. Cl.
    *F26B 13/18*          (2006.01)
    *H01M 4/04*          (2006.01)

(58) Field of Classification Search
    USPC ........................................................ 34/306
    See application file for complete search history.

(56)            References Cited

U.S. PATENT DOCUMENTS

| | | | |
|---|---|---|---|
| 7,363,729 B2 * | 4/2008 | Tanaka ...................... | F26B 3/28 |
| | | | 205/333 |
| 8,196,312 B2 * | 6/2012 | Taguchi .................. | F26B 13/10 |
| | | | 159/7 |
| 8,756,825 B2 * | 6/2014 | Priebe ...................... | F26B 3/22 |
| | | | 34/76 |
| 9,096,079 B2 * | 8/2015 | Priebe .................. | B41J 11/0022 |
| 9,171,714 B2 * | 10/2015 | Mori ....................... | H10P 70/23 |
| 9,879,908 B2 * | 1/2018 | Triglia, Jr. .............. | F26B 3/347 |
| 11,942,618 B2 * | 3/2024 | Basu ......................... | B05C 5/00 |
| 12,048,910 B2 * | 7/2024 | Fan ........................ | B01J 19/006 |
| 12,085,335 B2 * | 9/2024 | Lin ........................... | F26B 3/04 |
| 12,312,186 B2 * | 5/2025 | Abe ....................... | B65G 54/02 |

| | | | | |
|---|---|---|---|---|
| 2014/0304982 A1 | 10/2014 | Morishima et al. | | |
| 2020/0156128 A1 | 5/2020 | Yoo et al. | | |
| 2024/0384931 A1 * | 11/2024 | Moon ................... | | F26B 13/002 |

FOREIGN PATENT DOCUMENTS

| | | | | | | |
|---|---|---|---|---|---|---|
| EP | 4223675 | B1 | * | 10/2024 | ............ | B65G 47/91 |
| JP | H11102696 | A | | 4/1999 | | |
| JP | 2001113215 | A | | 4/2001 | | |
| JP | 2001351616 | A | | 12/2001 | | |
| JP | 2009280355 | A | | 12/2009 | | |
| JP | 2010225467 | A | | 10/2010 | | |
| JP | 2015099691 | A | | 5/2015 | | |
| JP | 6038813 | B2 | | 12/2016 | | |
| JP | 2019163903 | A | | 9/2019 | | |
| JP | 2021093304 | A | | 6/2021 | | |
| JP | 7667790 | B2 | * | 4/2025 | ............ | B65G 47/91 |
| KR | 20120076850 | A | | 7/2012 | | |
| KR | 101181824 | B1 | | 9/2012 | | |
| KR | 20130085828 | A | | 7/2013 | | |
| KR | 101810146 | B1 | | 12/2017 | | |
| KR | 20200059001 | A | | 5/2020 | | |
| KR | 20200118606 | A | | 10/2020 | | |
| KR | 20230067929 | A | * | 5/2023 | ............ | H01M 4/04 |
| WO | WO-2023085654 | A1 | * | 5/2023 | ............ | H01M 4/04 |

OTHER PUBLICATIONS

Extended European Search Report including Written Opinion for Application No. 22893077.2 dated Jun. 17, 2024, pp. 1-7.

* cited by examiner

【FIG. 1】
<u>10</u>
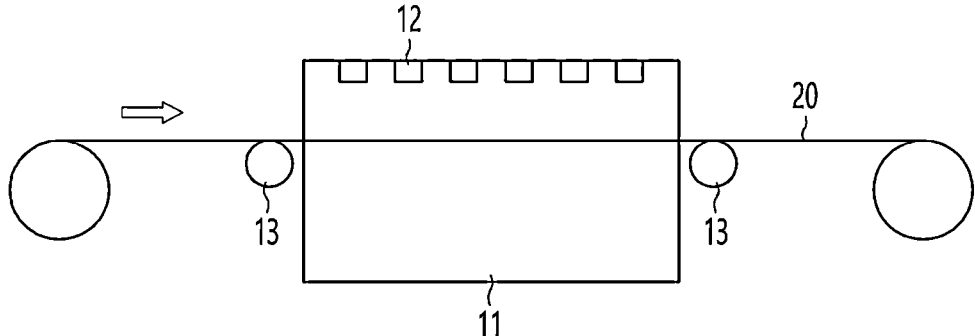
【FIG. 2】
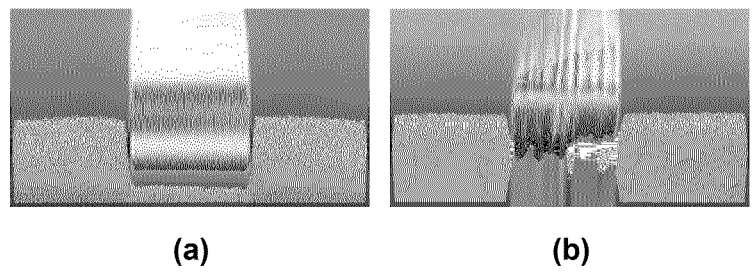
(a) (b)
【FIG. 3】
<u>1000</u>
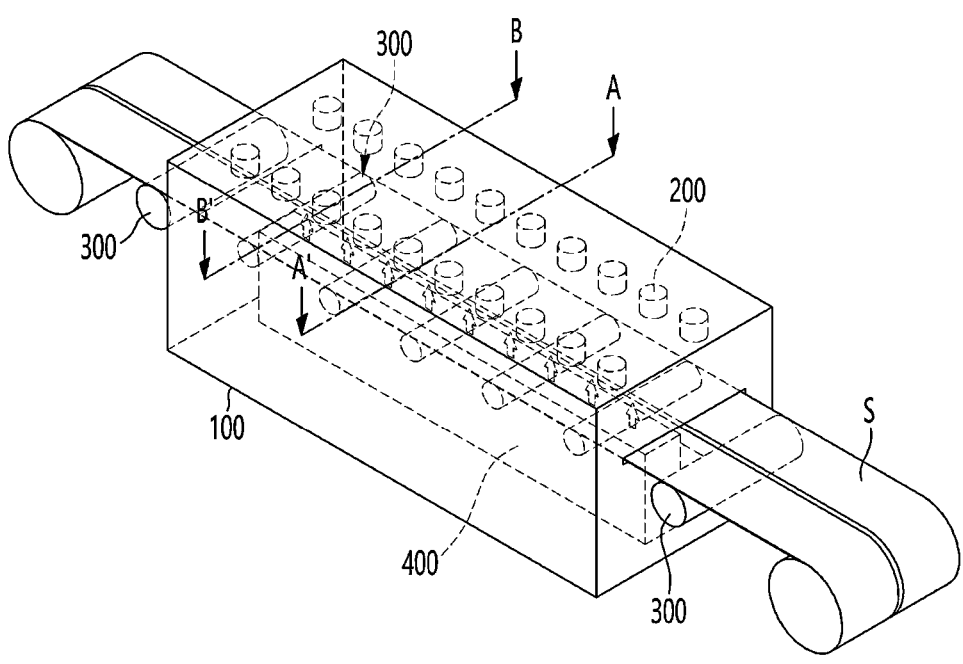

【FIG. 4】
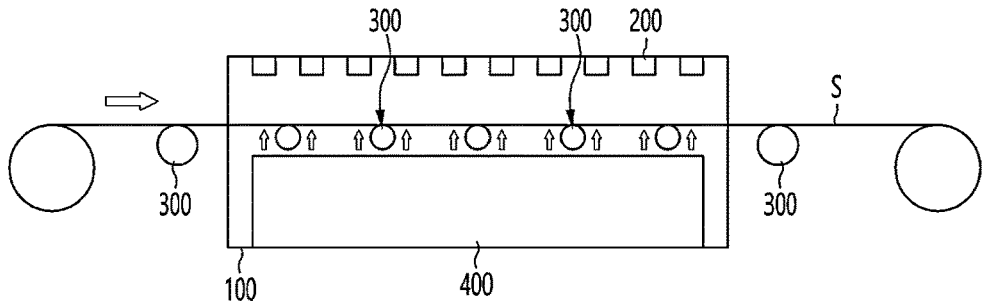
【FIG. 5】
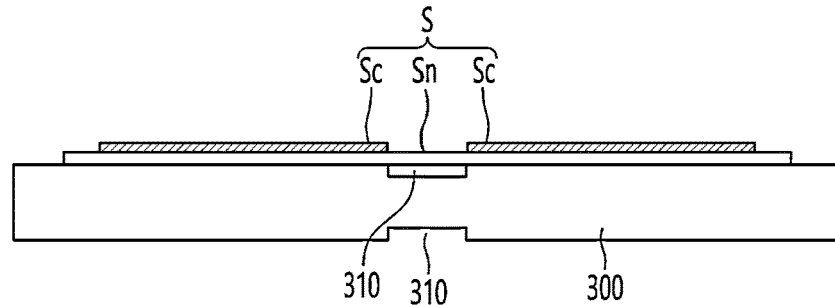
【FIG. 6】
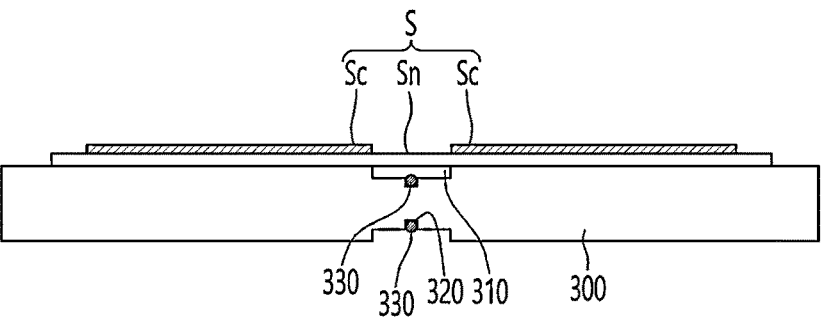
【FIG. 7】
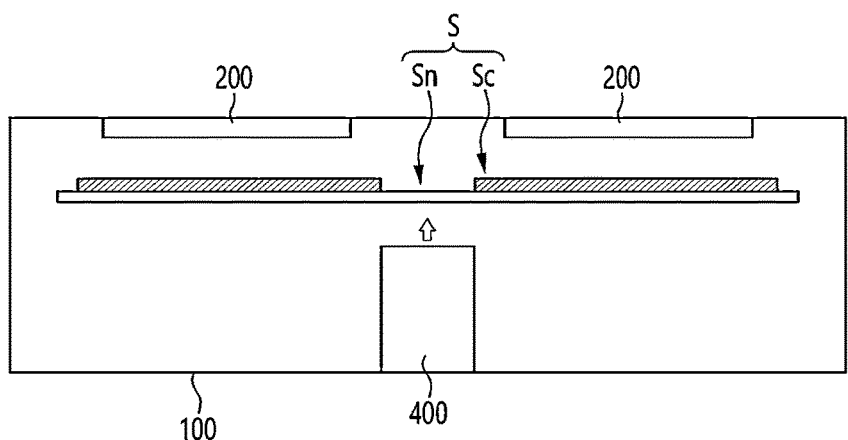

ELECTRODE SHEET DRYING APPARATUS CAPABLE OF PREVENTING THERMAL WRINKLES IN NON-COATED PORTION

CROSS-REFERENCE TO RELATED APPLICATIONS

This application is a national phase entry under 35 U.S.C. § 371 of International Application No. PCT/KR2022/016532, filed on Oct. 27, 2022, which claims priority to Korean Patent Application No. 10-2021-0153675 filed on Nov. 10, 2021, the disclosures of which are incorporated herein by reference in their entireties.

TECHNICAL FIELD

The present invention relates to an electrode sheet drying apparatus capable of preventing thermal wrinkles in a non-coated portion, and more particularly to an electrode sheet drying apparatus capable of preventing thermal wrinkles in a non-coated portion configured such that a guide roll and the non-coated portion are spaced apart from each other by a predetermined distance in order to prevent occurrence of a thermal wrinkle phenomenon in the non-coated portion when the electrode sheet is dried and a means configured to selectively cool the non-coated portion is provided.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel cadmium battery, a nickel hydride battery, and a nickel zinc battery as secondary batteries that are widely used at present.

In general, such a secondary battery is configured such that an electrode assembly and an electrolytic solution are received in a battery case.

Here, the electrode assembly may generally be a jelly-roll type assembly, which is configured to have a structure in which a long sheet type positive electrode and a long sheet type negative electrode are wound in the state in which a separator is interposed therebetween, a stacked type assembly, which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked in the state in which a separator is interposed therebetween and are then attached to each other.

In addition, an electrolyte may be replaced by a solid electrolyte or a gel type quasi-solid electrolyte obtained by adding an additive to a solid electrolyte, the gel type quasi-solid electrolyte having an intermediate phase between a liquid and a solid, in addition to a liquid electrolyte, which is commonly used.

The electrode assembly is received in the battery case, and the secondary battery may be classified as a cylindrical battery having the electrode assembly mounted in a cylindrical metal can, a prismatic battery having the electrode assembly mounted in a prismatic metal can, or a pouch-shaped battery having the electrode assembly mounted in a pouch-shaped case made of an aluminum laminate sheet based on the kind of the battery case.

Meanwhile, a method of manufacturing the electrode of the secondary battery includes a process of applying a slurry manufactured by dispersing an active material, a conductive agent, and a binder in a solvent to an electrode current collector and drying the slurry.

At this time, the electrode may be dried using a method of introducing a sheet type electrode into a drying apparatus in a state of being wound around a roll and drying the electrode. In this case, however, as the drying process is performed in an overlapping state, there is a difference in dryness between the inside and the outside of the electrode.

FIG. 1 is a front view schematically showing the structure of a conventional electrode sheet drying apparatus, and FIG. 2 is a view showing the state of a non-coated portion (a) before and (b) after an electrode sheet is introduced into a chamber using the conventional electrode sheet drying apparatus.

As shown in FIG. 1, the conventional electrode sheet drying apparatus includes a chamber 11 having an empty interior, a heating means 12, and a guide roll 13, and an electrode sheet 20 is dried while passing through the conventional electrode sheet drying apparatus.

The conventional electrode sheet drying apparatus has a merit in that it is possible to uniformly dry the electrode sheet 20. Since the entirety of the electrode sheet 20 is heated, however, thermal wrinkles are generated in a non-coated portion, i.e. a portion which has no active material applied thereto and from which an electrode current collector is exposed, as shown in (b) of FIG. 2.

The reason that such thermal wrinkles are generated is that, when the electrode sheet enters the chamber, which is maintained at a relatively high temperature, rigidity of the electrode current collector made of metal foil is reduced. In particular, the temperature of the non-coated portion, which has no active material, becomes higher than the temperature of the region having the active material applied thereto. As a result, wrinkles are intensively generated in the non-coated portion.

Meanwhile, Patent Document 1 discloses an electrode drying apparatus including an air conditioner configured to cool air outside the vicinity of an outlet of a chamber, through which an electrode sheet is discharged, and a cool air discharge nozzle configured to discharge cooled air to a non-coated portion, thereby inhibiting occurrence of such thermal wrinkles.

The apparatus of Patent Document 1 has an advantage in that cool air is supplied to the non-coated portion, in which thermal wrinkles have already been generated in the high-temperature chamber, and therefore it is possible to more rapidly cool the non-coated portion than when natural cooling is performed outside the chamber, but has a problem in that it is not possible to fundamentally inhibit the occurrence of thermal wrinkles.

PRIOR ART DOCUMENT (Patent Document 1) Korean Registered Patent Publication No. 1810146

DISCLOSURE

Technical Problem

The present invention has been made in view of the above problems, and it is an object of the present invention to provide an electrode sheet drying apparatus capable of preventing the occurrence of a thermal wrinkle phenomenon in a non-coated portion when an electrode sheet is dried.

Technical Solution

An electrode sheet drying apparatus according to the present invention to accomplish the above object is an electrode sheet drying apparatus for drying an electrode sheet (S) including a pair of coated portions (Sc) each having an electrode active material applied to one surface of metal foil and a non-coated portion (Sn) located between the pair of coated portions (Sc), the non-coated portion having no electrode active material applied thereto, the electrode sheet drying apparatus including a chamber (100) configured to dry the electrode sheet (S) therein, the chamber having a rectangular structure, a heating means (200) provided at an upper part of the chamber (100), the heating means being configured to adjust the temperature in the chamber (100) to a temperature necessary to dry the electrode sheet (S), and at least one guide roll (300) configured to guide movement of the electrode sheet (S) in the chamber (100) and to maintain tension of the electrode sheet (S), wherein a part of the electrode sheet (S) is moved in a state of being spaced apart from the guide roll (300) by a predetermined distance.

Also, in the electrode sheet drying apparatus according to the present invention, the guide roll (300) may be cylindrical, and a first concave recess (310) having a predetermined depth and width may be provided along a circumferential surface of the guide roll.

Also, in the electrode sheet drying apparatus according to the present invention, the first concave recess (310) may be located in the middle of the guide roll (300) in a longitudinal direction thereof.

Also, in the electrode sheet drying apparatus according to the present invention, the non-coated portion (Sn) may be located above the first concave recess (310) in a state of being spaced apart therefrom.

Also, in the electrode sheet drying apparatus according to the present invention, the non-coated portion (Sn) and the interface between the coated portion (Sc) and the non-coated portion (Sn) may be located above the first concave recess (310).

Also, in the electrode sheet drying apparatus according to the present invention, a second concave recess (320) having a predetermined depth and width may be further provided in the first concave recess (310).

Also, in the electrode sheet drying apparatus according to the present invention, a cooling pipe (330) disposed in a direction perpendicular to the central axis of the guide roll (300) may be located at the second concave recess (320).

Also, in the electrode sheet drying apparatus according to the present invention, the non-coated portion (Sn) may be located in a state of being spaced apart from the cooling pipe (330).

Also, in the electrode sheet drying apparatus according to the present invention, opposite ends of the cooling pipe (330) may be located outside the chamber (100).

Also, in the electrode sheet drying apparatus according to the present invention, the heating means (200) may be any one of an infrared lamp, a heating coil, and a fan heater.

Advantageous Effects

An electrode sheet drying apparatus capable of preventing thermal wrinkles in a non-coated portion according to the present invention has a merit in that a concave recess is formed in a guide roll, whereby a non-coated portion of an electrode sheet is spaced apart from the guide roll by a predetermined distance, and therefore it is possible to reduce the occurrence of thermal wrinkles in the non-coated portion.

In addition, the electrode sheet drying apparatus capable of preventing the thermal wrinkles in the non-coated portion according to the present invention has an advantage in that a cooling means is provided under the non-coated portion, whereby it is possible to minimize the occurrence of thermal wrinkles in the non-coated portion during a drying process.

DESCRIPTION OF DRAWINGS

FIG. 1 is a front view schematically showing the structure of a conventional electrode sheet drying apparatus.

FIG. 2 is a view showing the state of a non-coated portion (a) before and (b) after an electrode sheet is introduced into a chamber using the conventional electrode sheet drying apparatus.

FIG. 3 is a perspective view schematically showing the structure of an electrode sheet drying apparatus according to an embodiment of the present invention.

FIG. 4 is a front view schematically showing the structure of the electrode sheet drying apparatus according to the embodiment of the present invention.

FIG. 5 is a sectional view taken along line B-B' of FIG. 3, illustrating the structure of a guide roll.

FIG. 6 is a view showing a modification of the guide roll.

FIG. 7 is a sectional view taken along line A-A' of FIG. 3.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an electrode sheet drying apparatus according to the present invention will be described with reference to the accompanying drawings.

FIG. 3 is a perspective view schematically showing the structure of an electrode sheet drying apparatus according to an embodiment of the present invention, FIG. 4 is a front view schematically showing the structure of the electrode sheet drying apparatus according to the embodiment of the present invention, and FIG. 5 is a sectional view taken along line B-B' of FIG. 3, illustrating the structure of a guide roll.

When describing the electrode sheet drying apparatus 1000 according to the present invention with reference to FIGS. 3 to 5, the electrode sheet drying apparatus 1000, which is an apparatus for continuously drying a long sheet type electrode, i.e., an electrode sheet S, includes a chamber 100, a heating means 200, a guide roll 300, and a cooling means 400.

First, the electrode sheet S, which is to be dried, is constituted by a coated portion Sc having an electrode active material applied to one surface of metal foil and a non-coated portion Sn having no electrode active material applied thereto.

Here, a pair of coated portions Sc spaced apart from each other by a predetermined distance may be provided. At this time, the non-coated portion Sn is located between the pair of coated portions Sc. Although the coated portion Sc is shown as being formed on only one surface of the metal foil in the drawings, it is obvious that the coated portion Sc may be provided at each of opposite surfaces of the metal foil.

Meanwhile, the electrode active material is classified as a positive electrode active material or a negative electrode active material, and a conductive agent and a binder is added to the electrode active material to manufacture a slurry, which is applied to the surface of the metal foil.

The positive electrode active material may be constituted, for example, by a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2 V_2O_7$; a Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

The conductive agent is generally added so that the conductive agent accounts for 1 to 30 weight % based on the total weight of a mixture including the positive electrode active material.

The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or a conductive material, such as a polyphenylene derivative, may be used as the conductive agent.

The binder is a component assisting in binding between the active material and the conductive agent and in binding with a current collector. The binder is generally added in an amount of 1 to 30 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

In addition, as the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 < x \leq 1$; $1 \leq y \leq 3$; $1 \leq z \leq 8$); lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; a Li—Co—Ni-based material; or a Si-based material, such as Si, SiO, $SiO_2$, or a mixture thereof. However, the present invention is not limited thereto.

In addition, the conductive agent and the binder described above may be optionally further included in the negative electrode active material.

The chamber 100, which is configured to receive the electrode sheet S constituted by the coated portion Sc having the electrode active material applied thereto and the non-coated portion Sn having no electrode active material applied thereto in order to dry the coated portion Sc, may have a rectangular structure.

Specifically, the interior of the chamber is empty, a part of each of a front surface and a rear surface of the chamber is open such that the electrode sheet S can be continuously supplied and discharged, and the other surfaces, i.e. a lower surface, an upper surface, and a pair of side surfaces, of the chamber are closed.

Consequently, it is possible to maintain the temperature in the chamber within a predetermined temperature range and to prevent introduction of external foreign matter into the chamber.

The heating means 200 is configured to maintain the temperature in the chamber 100 within a predetermined temperature range. Specifically, the heating means maintains the temperature in the chamber 100 within a predetermined temperature range such that the coated portion Sc of the electrode sheet S can be dried. Although the heating means is shown as being provided in the chamber 100 at an upper part thereof in the drawings, it is obvious that the heating means may be further provided at a side of the chamber.

Various known heat sources capable of heating the interior of the chamber 100 or the electrode sheet S and maintaining uniform temperature, such as heat, hot air, or a light source, may be used as the heating means 200 that performs the above function. For example, an infrared lamp, a heating coil, and a fan heater may be used alone or in a combination of two or more thereof.

Next, the guide roll 300 is located in the chamber 100 including the vicinities of an inlet and an outlet of the chamber 100 in order to guide movement of the electrode sheet S and to maintain the electrode sheet S dried in the chamber 100 at uniform tension without drooping.

As previously described, the guide roll 300 supports the entirety of the electrode sheet S so as to have uniform tension without distinguishing between the coated portion Sc and the non-coated portion Sn of the electrode sheet S. As a result, the non-coated portion Sn having no active material applied thereto of the electrode sheet S is stretched to a relatively great extent in the chamber 100 heated to a predetermined temperature, whereby wrinkles are formed in the non-coated portion.

However, the guide roll 300 located in the chamber 100 of the present invention is cylindrical, and a first concave recess 310 having a predetermined depth and width is provided along a circumferential surface of the guide roll, whereby it is possible to minimize formation of wrinkles in the non-coated portion Sn.

Specifically, the temperature in the chamber 100 is maintained within a range of about 100 to 200° C. such that the coated portion Sc can be dried, and the guide roll 300 retains high heat therein, since the guide roll is made of a heat-resistant material, such as metal or ceramic. When the non-coated portion Sn having no active material applied thereto comes into tight contact with the guide roll 300, the non-coated portion is more easily stretched than the coated portion Sc, whereby wrinkles are generated in the non-coated portion.

In the present invention, however, the first concave recess 310 is located in the middle of the guide roll 300 in a longitudinal direction thereof, whereby the coated portion Sc is transferred in a state of being in tight contact with the guide roll, whereas the non-coated portion Sn, in which wrinkles may be easily formed, is spaced apart from the guide roll. As a result, it is possible to reduce transfer of hot heat of the guide roll 300 to the non-coated portion Sn, and therefore it is possible to reduce generation of wrinkles in the non-coated portion Sn.

Here, although it is most preferable for the entire region of the non-coated portion Sn to be located above the first concave recess 310 such that the non-coated portion does not come into tight contact with the guide roll 300, the interface between the coated portion Sc and the non-coated portion Sn may be located above the first concave recess 310.

In addition, although the depth of the first concave recess 310 is not particularly restricted, it is preferable for the depth of the first concave recess to be set to such an extent that the non-coated portion Sn does not contact the first concave recess.

FIG. 6 shows a modification of the guide roll. As shown in FIG. 6, in the modification of the guide roll 300, a second concave recess 320 having a predetermined depth and width may be further provided in the first concave recess 310. At this time, a cooling pipe 330 disposed in a direction perpendicular to the central axis of the guide roll 300 is located at the second concave recess 320.

Although the non-coated portion Sn is located vertically above the first concave recess 310 of the guide roll 300, whereby the non-coated portion does not directly contact the guide roll, there is a possibility of wrinkles being formed in the non-coated portion since the temperature in the chamber 100 is relatively high.

In the modification, however, a low-temperature refrigerant circulates along the cooling pipe 330 in the second concave recess 320, whereby it is possible to inhibit an increase in temperature of the non-coated portion Sn.

Here, the cooling pipe 330 and the non-coated portion Sn are slightly spaced apart from each other, the cooling pipe 330 extends long along the second concave recess 320 of the guide roll 300, and opposite ends of the cooling pipe are connected to a refrigerant circulation and supply device (not shown) located outside the chamber 100.

FIG. 7 is a sectional view taken along line A-A' of FIG. 3. A description will be given with reference to FIGS. 3, 4, and 7.

In addition, the electrode sheet drying apparatus 1000 according to the present invention further includes a cooling means 400 configured to reliably lower the temperature of the non-coated portion Sn in order to minimize stretching of the non-coated portion.

Specifically, the cooling means 400 may be provided in the vicinity of a bottom of the electrode sheet drying apparatus 1000 so as to face a rear surface of the electrode sheet S at which no coating portion Sc is formed, and the cooling means supplies cold air toward the non-coated portion Sn.

Various known cooling means may be used as the cooling means 400, and the cooling means may be manufactured using an air cooling device or a nozzle configured to spray cooled air to a desired position so as to have a desired structure.

In addition, the cooling means 400 may be configured to continuously supply cold air to the non-coated portion from the vicinity of an inner inlet of the chamber 100 to the vicinity of an outlet of the chamber 100, i.e. from the point in time at which the electrode sheet S enters the chamber 100 to the point in time at which the electrode sheet is discharged from the chamber 100, in order to cool the non-coated portion.

In addition, when the cooling means 400 is a nozzle configured to spray cold air, a height adjustment means configured to adjust the height of the nozzle may be provided, and a separate cooling air adjustment means configured to adjust the temperature and amount of air to be sprayed may be further provided.

Furthermore, it is also possible to control the cooling means 400 while continuously measuring the temperature of the non-coated portion Sn through a thermometer configured to measure the temperature of the non-coated portion Sn, such as a non-contact type infrared thermometer.

When the temperature of the non-coated portion Sn is lowered to a predetermined temperature range, as described above, it is possible to reduce stretching locally generated in the non-coated portion Sn and to inhibit formation of wrinkles in the non-coated portion.

Meanwhile, as described above, the binder included in the active material is a component assisting in binding between the active material and the conductive agent and in binding with the metal foil.

When the metal foil is heated during a drying process, whereby the temperature of the metal foil is increased, however, a phenomenon in which the binder distributed on the contact surface with the metal foil migrates to the interior of the uppermost layer (outer surface) of the coated portion Sc, i.e. a migration phenomenon, may occur.

When such a migration phenomenon occurs, the amount of the binder remaining on the surface of the foil is reduced, whereby defects (an electrode deintercalation phenomenon, etc.) may occur due to a reduction in interfacial adhesive force between the active material and the metal foil. In the present invention, cold air is supplied to the non-coated portion Sn using the cooling means 400, whereby the temperature of the entire metal foil as well as the non-coated portion Sn may be reduced, compared to a conventional apparatus having no cooling means 400, and therefore there is also a merit in that it is possible to inhibit the migration phenomenon.

Meanwhile, although not shown in the drawings, the electrode sheet drying apparatus 1000 may further include a humidity adjustment unit configured to adjust the humidity in the chamber 100, a temperature sensor configured to measure the temperature in the chamber 100, and a controller configured to control the heating means 200.

Hereinafter, a method of drying the electrode sheet S using the electrode sheet drying apparatus 1000 according to the present invention will be described.

The drying method according to the present invention includes a) a step of introducing the electrode sheet S into the chamber 100 and heating and drying the electrode sheet S and b) a step of cooling the non-coated portion Sn of the electrode sheet S.

Here, step b) is a step of continuously supplying cold air to the non-coated portion Sn under the electrode sheet S until drying of the electrode sheet S is completed after drying of the electrode sheet is started in order to maintain the temperature of the non-coated portion Sn at a predetermined temperature or lower.

In addition, step a) and step b) may be simultaneously performed. Here, simultaneous performance means that cold air starts to be supplied to the non-coated portion Sn from almost the moment the electrode sheet S enters the chamber 100.

It is possible to manufacture a battery cell including the electrode manufactured through the drying method, and it is possible to manufacture a battery module or a battery pack using the battery cell.

The battery module or the battery pack may be used as a power supply source for various kinds of devices.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

1000: Electrode sheet drying apparatus
100: Chamber
200: Heating means
300: Guide roll
310: First concave recess
320: Second concave recess
330: Cooling pipe
400: Cooling means
S: Electrode sheet
Sc: Coated portion
Sn: Non-coated portion
The invention claimed is:

1. An electrode sheet drying apparatus for drying an electrode sheet comprising a metal foil having a pair of coated portions each having an electrode active material applied to a first surface of the metal foil and a non-coated portion located between the pair of coated portions, the non-coated portion having no electrode active material applied thereto, the electrode sheet drying apparatus comprising:
  a chamber configured to dry the electrode sheet therein, the chamber having a rectangular cross-sectional shape;
  a heater provided at an upper part of the chamber, the heater being configured to adjust a temperature in the chamber at or above a minimum temperature necessary to dry the electrode sheet; and
  a guide roll configured to guide movement of the electrode sheet in the chamber and to maintain a tension of the electrode sheet, the apparatus being configured such that a part of the electrode sheet is moved in a state of being spaced apart from a confronting part of the guide roll by a predetermined distance.

2. The electrode sheet drying apparatus according to claim 1, wherein the guide roll is cylindrical, and has a first concave recess extending into a circumferential surface thereof.

3. The electrode sheet drying apparatus according to claim 2, wherein the first concave recess is located in a middle of the guide roll in a longitudinal direction thereof.

4. The electrode sheet drying apparatus according to claim 3, wherein the apparatus is configured such that the non-coated portion of the metal foil is located above and spaced apart from the first concave recess of the guide roll.

5. The electrode sheet drying apparatus according to claim 3, wherein the apparatus is configured such that the non-coated portion of the metal foil and an interface between the coated portion of the metal foil and the non-coated portion of the metal foil are located above the first concave recess of the guide roll.

6. The electrode sheet drying apparatus according to claim 2, wherein the guide roll has a second concave recess located in the first concave recess, the second concave recess extending into an exposed surface of the guide roll within the first concave recess.

7. The electrode sheet drying apparatus according to claim 6, wherein the guide roll has a cooling pipe disposed within the second concave recess and extending in a direction perpendicular to a central axis of the guide roll.

8. The electrode sheet drying apparatus according to claim 7, wherein the apparatus is configured such that the non-coated portion of the metal foil is spaced apart from the cooling pipe.

9. The electrode sheet drying apparatus according to claim 7, wherein first and second opposite ends of the cooling pipe are located outside of the chamber.

10. The electrode sheet drying apparatus according to claim 1, wherein the heater is any one of: an infrared lamp, a heating coil, or a fan heater.

11. A method of drying an electrode sheet comprising a metal foil having a pair of coated portions each having an electrode active material applied to a first surface of the metal foil and a non-coated portion located between the pair of coated portions, the non-coated portion having no electrode active material applied thereto, the method comprising:
  moving the electrode sheet with a guide roll into a chamber while maintaining a tension within the electrode sheet, the electrode sheet being moved while a part of the electrode sheet is spaced apart from a confronting part of the guide roll by a predetermined distance; and
  heating the coated portions of the metal foil within the chamber at or above a minimum temperature necessary to dry the electrode sheet.

12. The method according to claim 11, wherein the guide roll is cylindrical and has a first concave recess extending into a circumferential surface thereof.

13. The method according to claim 12, wherein the first concave recess is located in a middle of the guide roll in a longitudinal direction thereof.

14. The method according to claim 13, wherein the electrode sheet is moved while the non-coated portion of the metal foil is located above and spaced apart from the first concave recess of the guide roll.

15. The method according to claim 13, wherein the electrode sheet is moved while the non-coated portion of the metal foil and an interface between the coated portion of the metal foil and the non-coated portion of the metal foil are located above the first concave recess of the guide roll.

16. The method according to claim 12, wherein the guide roll has a second concave recess located in the first concave recess, the second concave recess extending into an exposed surface of the guide roll within the first concave recess.

17. The method according to claim 16, wherein the guide roll has a cooling pipe disposed within the second concave recess and extending in a direction perpendicular to a central axis of the guide roll, the method further comprising cooling the non-coated portion of the metal foil while heating the coated portions of the metal foil.

18. The method according to claim 17, wherein the electrode sheet is moved while the non-coated portion of the metal foil is spaced apart from the cooling pipe.

19. The method according to claim 17, wherein first and second opposite ends of the cooling pipe are located outside of the chamber.

20. The method according to claim 11, wherein the heater is any one of: an infrared lamp, a heating coil, or a fan heater.

\*   \*   \*   \*   \*